United States Patent
Michael et al.

(10) Patent No.: US 6,715,039 B1
(45) Date of Patent: Mar. 30, 2004

(54) CACHE SLOT PROMOTION IN A REPLACEMENT QUEUE CACHE USING DETERMINATIONS OF PROBABILITIES AND COSTS

(75) Inventors: Orit Levin Michael, Newton, MA (US); Ron Arnan, Brookline, MA (US); Amnon Naamad, Brookline, MA (US); Sachin More, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 440 days.

(21) Appl. No.: 09/951,016

(22) Filed: Sep. 12, 2001

(51) Int. Cl.[7] ................................................. G06F 12/00
(52) U.S. Cl. ....................... 711/133; 711/130; 711/134; 711/152; 711/159
(58) Field of Search .................................. 711/133, 130, 711/134, 152, 159

(56) References Cited

U.S. PATENT DOCUMENTS

| | | | |
|---|---|---|---|
| 5,206,939 A | | 4/1993 | Yanai et al. ..................... 711/4 |
| 5,381,539 A | | 1/1995 | Yanai et al. ................... 711/133 |
| 5,592,432 A | | 1/1997 | Vishlitzky et al. ...... 365/230.03 |
| 5,706,467 A | * | 1/1998 | Vishlitzky et al. ........... 711/129 |
| 5,751,993 A | * | 5/1998 | Ofek et al. ................... 711/136 |
| 5,778,394 A | | 7/1998 | Galtzur et al. ............... 707/205 |
| 5,787,473 A | * | 7/1998 | Vishlitzky et al. ........... 711/134 |
| 5,822,749 A | * | 10/1998 | Agarwal ......................... 707/2 |
| 5,845,147 A | | 12/1998 | Vishlitzky et al. .............. 710/5 |
| 5,857,208 A | | 1/1999 | Ofek ............................. 707/204 |
| 6,408,364 B1 | * | 6/2002 | Tan et al. ..................... 711/136 |
| 6,418,510 B1 | * | 7/2002 | Lamberts ...................... 711/113 |
| 6,678,805 B1 | * | 1/2004 | Corduneanu et al. ....... 711/154 |

OTHER PUBLICATIONS

Yeung et al., "Probability Based Replacement Algorithm for WWW Server Arrays," pp 670–677, IEEE, Dec. 1998.*
Zhao et al., "Measurement Based Intelligent Prefetch and Cach Technique in Web," pp168–173, IEEE, May 1999.*
U.S. patent application Ser. No. 09/535,134, Lambright et al., filed Mar. 24, 2000.

* cited by examiner

*Primary Examiner*—Matthew Kim
*Assistant Examiner*—Stephen Elmore
(74) *Attorney, Agent, or Firm*—Choate, Hall & Stewart (57) ABSTRACT

Techniques and criteria are used in connection with promoting a slot within a cache in the form of a replacement queue. A cache slot may be promoted based on an inequality that considers the following criteria: probability of losing a cache hit, gaining a cache hit, and the price or cost associated with promoting a slot. The foregoing criteria may be used in accordance with a predetermined promotion policy when the replacement queue is in a locked state and an unlocked state, or only when the replacement queue is in a locked state. Different costs may be associated with the state of the replacement queue as locked or unlocked as the replacement queue may be locked in connection with operations that are performed on the replacement queue. The cost associated with a locked replacement queue may be different than the cost associated with an unlocked replacement queue. Different thresholds and values associated with the foregoing criteria may be specified as dynamic system parameters.

48 Claims, 7 Drawing Sheets

CACHE SLOT PROMOTION IN A REPLACEMENT QUEUE CACHE USING DETERMINATIONS OF PROBABILITIES AND COSTS

BACKGROUND

1. Technical Field

This application generally relates to computer data storage, and more particularly to a ache used with computer data storage.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations and also administrative tasks, such as data backup and mirroring operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

Additionally, there may be a cache "promotion" where an element within the cache may be moved to a different location within the cache. Movement or relocation of an element within a cache may be considered a promotion if the relocation may increase the amount of time the element spends in the cache. Data may be stored in a cache in order to increase efficiency. However, there can be a cost associated with performing cache management operations, such as storing and retrieving data from the cache, in particular if the cache is locked for exclusive access in a particular implementation.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

An embodiment having a complex cache management scheme may increase traffic within a system, for example, on buses. Additionally, the number of times that a cache lock operation is performed may also increase. Since the lock operation may be expensive, it may be desirable to balance costs of maintaining data in the cache with an associated gain.

Thus, it may be desirous and advantageous to have an efficient technique used in connection with cache promotion operations which takes into account a balancing of costs and associated gains.

SUMMARY OF THE INVENTION

In accordance with one aspect of the invention is a method executed in a computer system for determining whether to promote a cache slot within a cache. It is determined whether a probability of losing a cache hit is greater than a ratio of a cost associated with promoting said cache slot to the gain of a cache hit. The cache slot is promoted in response to determining that said probability is greater than said ratio in which the promoting places the cache slot at a different position within said cache to increase duration of said cache slot being included in said cache.

In accordance with another aspect of the invention is a computer program product for determining whether to promote a cache slot within a cache comprising machine executable code for: determining whether a probability of losing a cache hit is greater than a ratio of a cost associated with promoting said cache slot to the gain of a cache hit; and promoting said cache slot in response to determining that said probability is greater than said ratio, said promoting placing said cache slot at a different position with said cache to increase duration of said cache slot being included in said cache.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
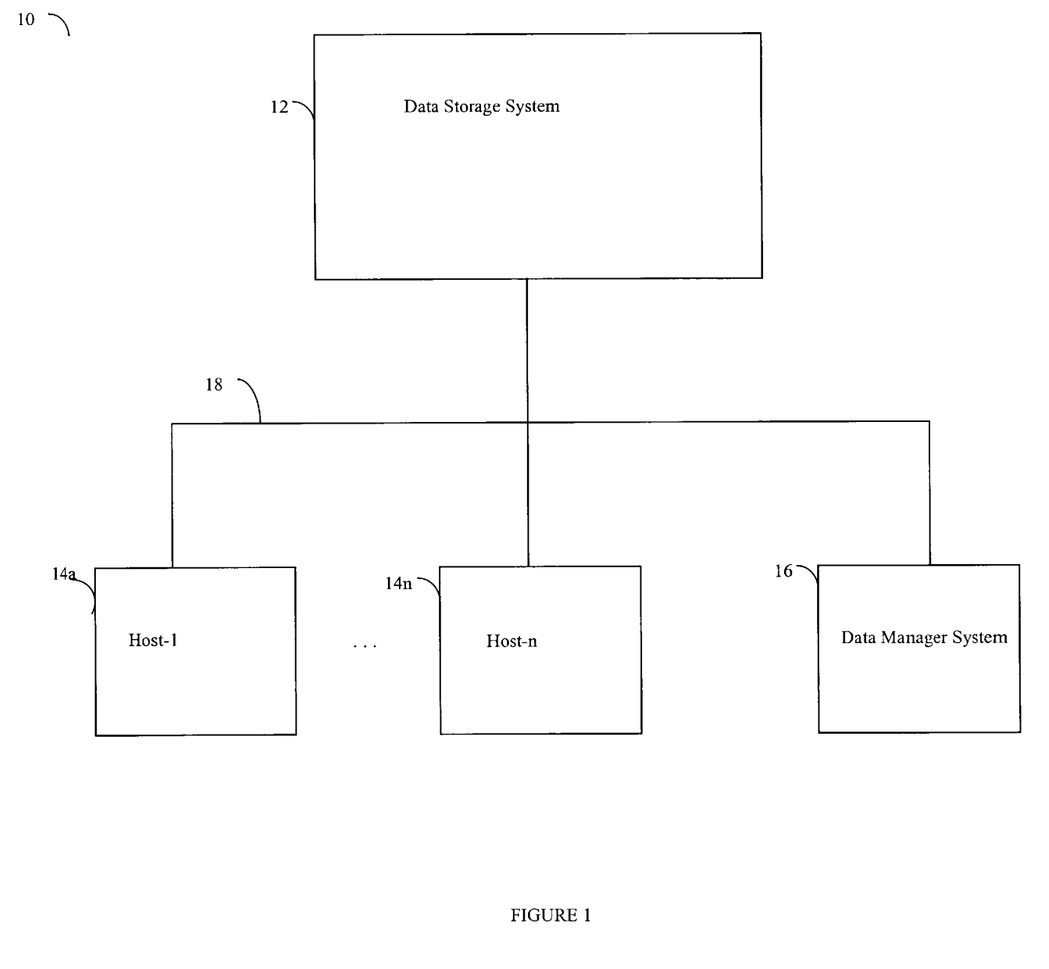
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
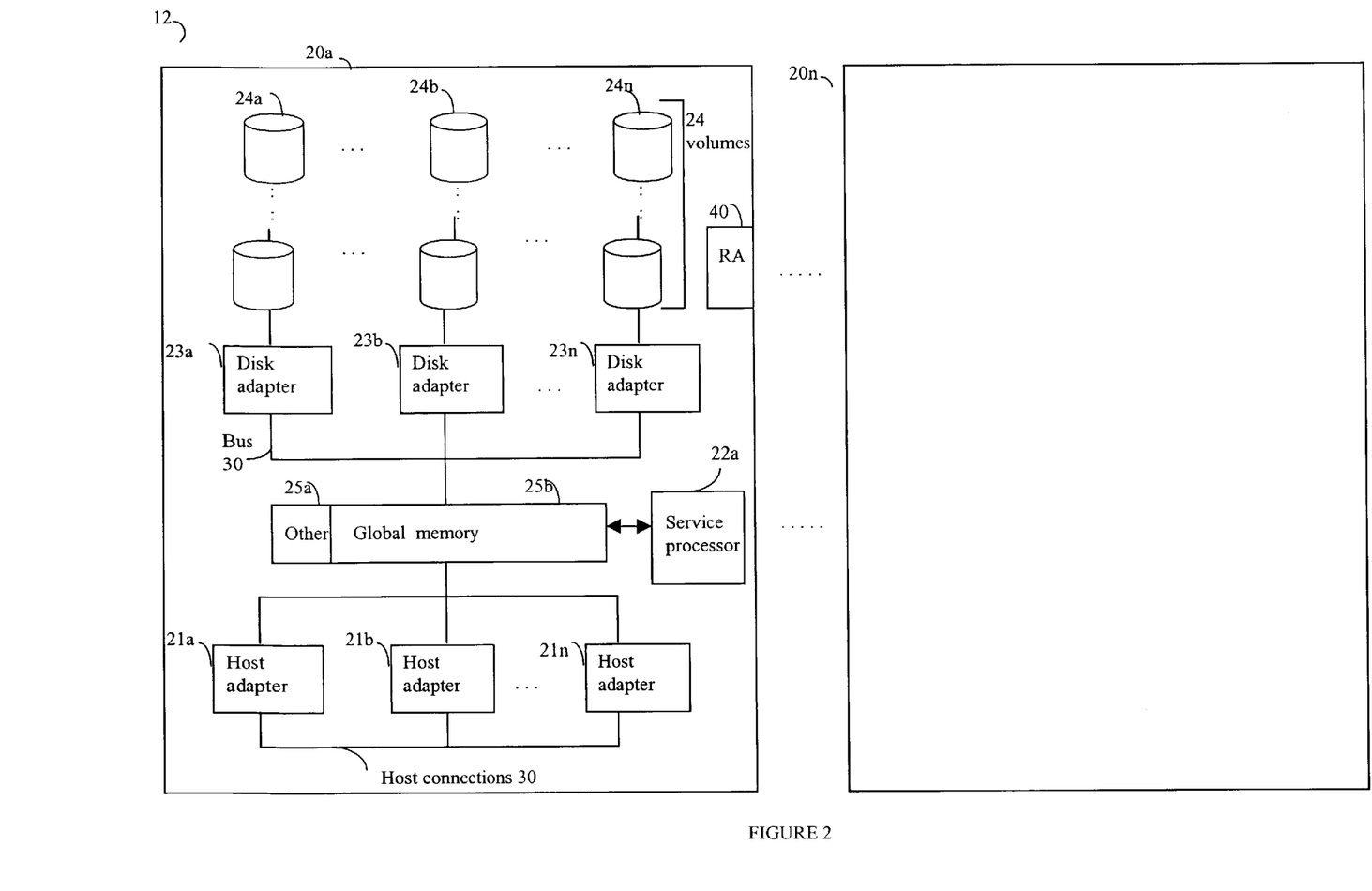
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Massachusetts. In this particular example, each of the Symmetrix™ storage systems 20a–20n may be inter-connected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrixn systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

As described above, an embodiment may include a cache in the global memory portion 25b of FIG. 2. An embodiment may include a single or multiple replacement queue arrangement in the cache. An example of an embodiment that includes a cache using multiple replacement queues is described in pending U.S. patent application Ser. No. 09/535,134, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

It should be noted that in an embodiment including a multiple replacement queue arrangement, there may be separate promotion decisions and data collections for one or more of the replacement queues in accordance with restrictions as to what devices use which of the replacement queues. This may vary with each embodiment.

Figure 3:
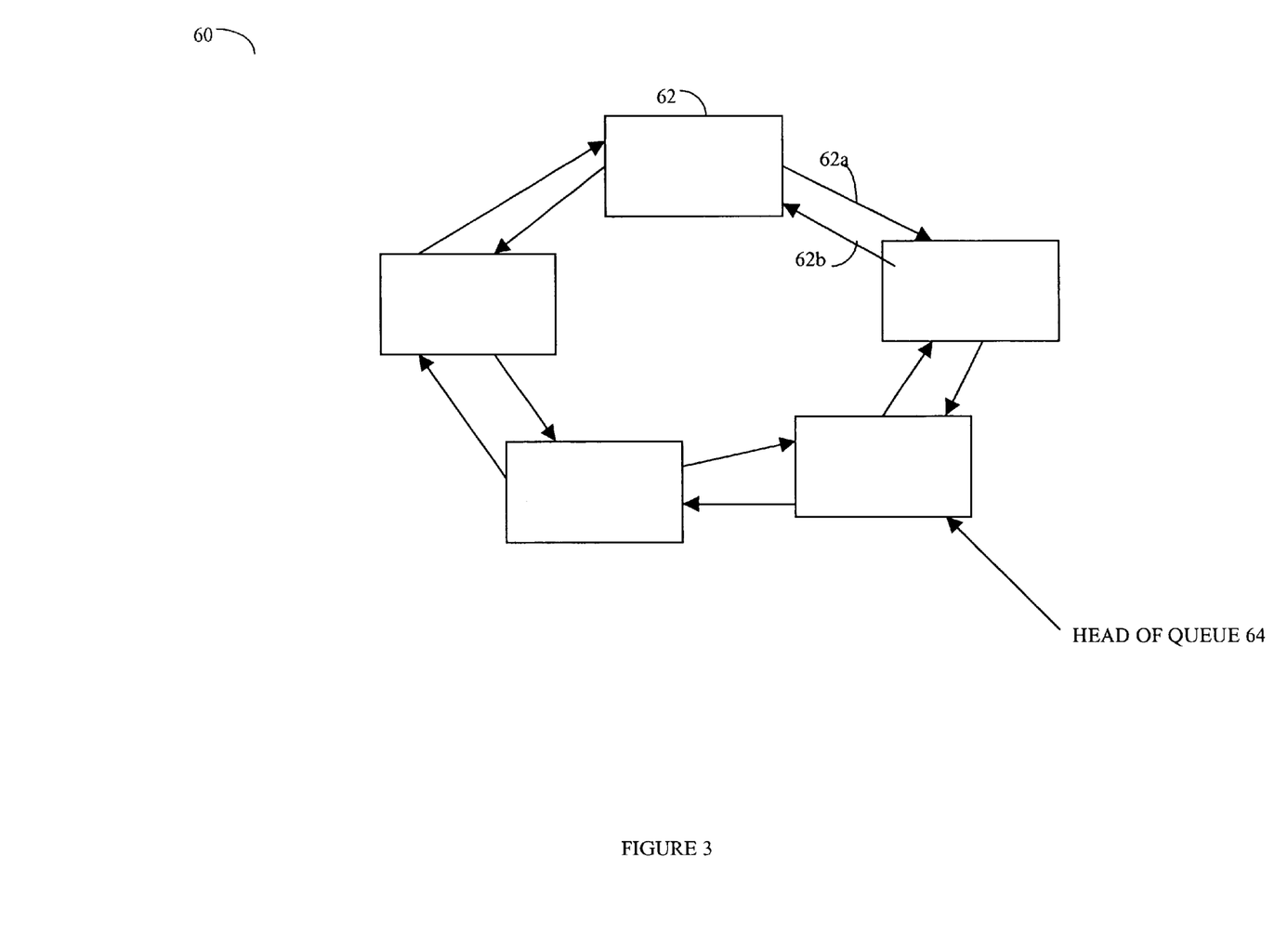
FIG. 3 is an example of an embodiment of a replacement queue.

Referring now to FIG. 3, shown is an example of an embodiment 60 of a replacement queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 62a and 62b, in a doubly linked list arrangement. Additionally, the head or beginning of the replacement queue is designated by a head pointer 64.

It should be noted that as described herein, an embodiment may include a cache which is in the form of the replacement queue using doubly linked list or other data structures known to those of ordinary skill in the art. The replacement queue described herein should not be construed as a limitation to the techniques described herein. Additionally, it should be noted that an embodiment may use a least-recently-used or other technique in determining which slots remain in the cache and which ones are removed.

Figure 4:
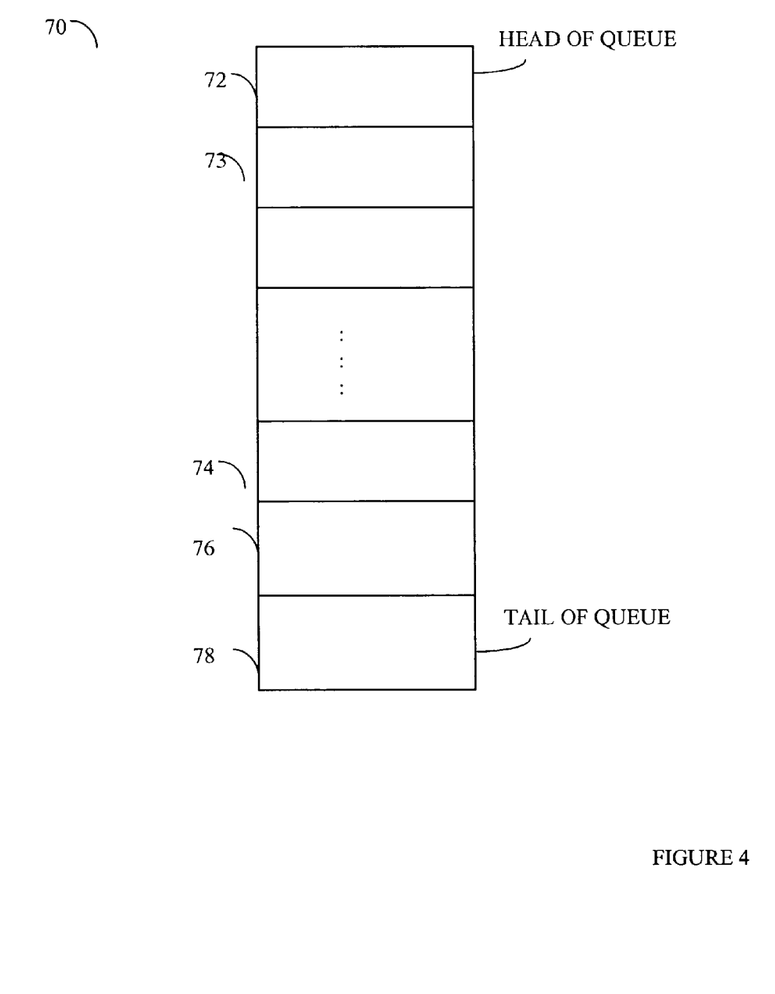
FIG. 4 is another representation of a replacement queue.

Referring now to FIG. 4, shown is an equivalent representation 70 of the previously described replacement queue 60 in connection with FIG. 3. The representation shown in FIG. 4 is a logical equivalent of the representation shown in FIG. 3. For purposes of explanation, the representation 70 will be used in following paragraphs. The representation 70 of FIG. 4 logically corresponds to that in FIG. 3 such that, for example, element 72 corresponds to the beginning cache slot as noted by the head of the replacement queue pointer 64 in connection with the previously described figure. Similarly, the last element of the replacement queue is denoted by slot 78 which in this example is labeled also as the tail of the replacement queue. Elements or slots may be inserted into the list at the head of the replacement queue and exit or leave the cache at the tail of the replacement queue.

For example, when an element is deposited into the cache, it may be placed at the head of he replacement queue in slot location denoted by 72 in connection with a read operation. dditional elements are progressively added to the head portion of the replacement queue 72. As elements are added to the head of the list, subsequent elements progress toward the tail of the list. When another slot is added to the replacement queue at position 72, the slot currently at position 72 moves to that slot designated as position 73 and the newly added element falls into the position of element 72.

An element may be placed in the replacement queue, for example, when an element is referenced in connection with an I/O operation such as a cache miss for a read operation. Once in the replacement queue, an element progresses through the replacement queue from the head 72 towards the tail 78 of the replacement queue.

One parameter that may be of interest in connection with a replacement queue may be referred to as the Fall Through Time (FTT). Generally, the FTT refers to the average amount of time it takes for an unpromoted slot once it is in the replacement queue to ex it the replacement queue. In other words, it is the average amount of time it takes a slot to pass through or "fall" through the replacement queue from the head position and then exit out of the replacement queue through the tail position. When an element is added to the replacement queue, that element which is at the tail of the replacement queue is displaced and a new element may be added to the top of the list at the head position. The FTT is described in issued U.S. Pat. No. 5,592,432, Vishlitzky et al.

The FTT may be calculated for each slot by taking a first time stamp at the position when an element is lastly placed at the head of the replacement queue (such as at position 72), and then taking a second time stamp value when that same slot exits the replacement queue (such as when a slot exits or leaves position 78). The difference between the second ending time stamp value and the starting or first time stamp value for each particular slot may be used in calculating an average amount of time. It is this average amount of time that represents the FTT for a large number of slots.

Generally, a large FTT may be associated with a large cache. Similarly, a smaller replacement queue may have associated with it a smaller FTT as this parameter represents, for an associated replacement queue, the amount of time it takes for a cache slot to pass from the beginning through and out the end of the replacement queue. In addition to the size of the cache, the FTT depends on the cache workload.

A technique referred herein as "promotion" of a cache slot may be used in connection with cache slots in an attempt to optimize or increase efficiency within the system described herein. Generally, promotion of a cache slot such as included in a replacement queue relates to the movement of the cache slot to a new position such that a promoted cache slot is less likely to be displaced from the replacement queue. Promotion is a technique that may be used to keep the most active slots in cache and remove those least recently used. An embodiment may use any one or more heuristics, as explained in more detail in following paragraphs, in connection with deciding when to promote a cache slot. For example, an embodiment may use past performance in connection with read hits to a particular slot as an indicator of future performance. In other words, those slots that are hit most recently and frequently may be used as indicators of which slots to promote.

A threshold promotion value may be established and used in determining when to promote a particular cache slot. If a cache slot is promoted, it is placed back into the cache at the head of the replacement queue position. Generally, this threshold promotion value represents a time value where, if a current time value associated with a particular cache slot is greater than this threshold, then this particular cache slot may be promoted. A current time stamp value may be associated with a slot at a particular point in time. The current time stamp value may be calculated by subtracting the starting or first time stamp value from a second time stamp value, which may then be compared to the threshold promotion value. If the current time stamp value is greater than the threshold promotion value, then this particular cache slot may be promoted by moving it to the head position (such as 72) within the replacement queue. Otherwise, this cache slot may not be promoted. It should be noted that the current time stamp may be determined when there is a hit or a partial hit to a particular cache slot. Use of time stamps in a cache management system is described in issued U.S. Pat. No. 5,592,432, Vishlitzky et al., entitled "Cache Management System Using Time Stamping for Replacement Queue".

Figure 5:
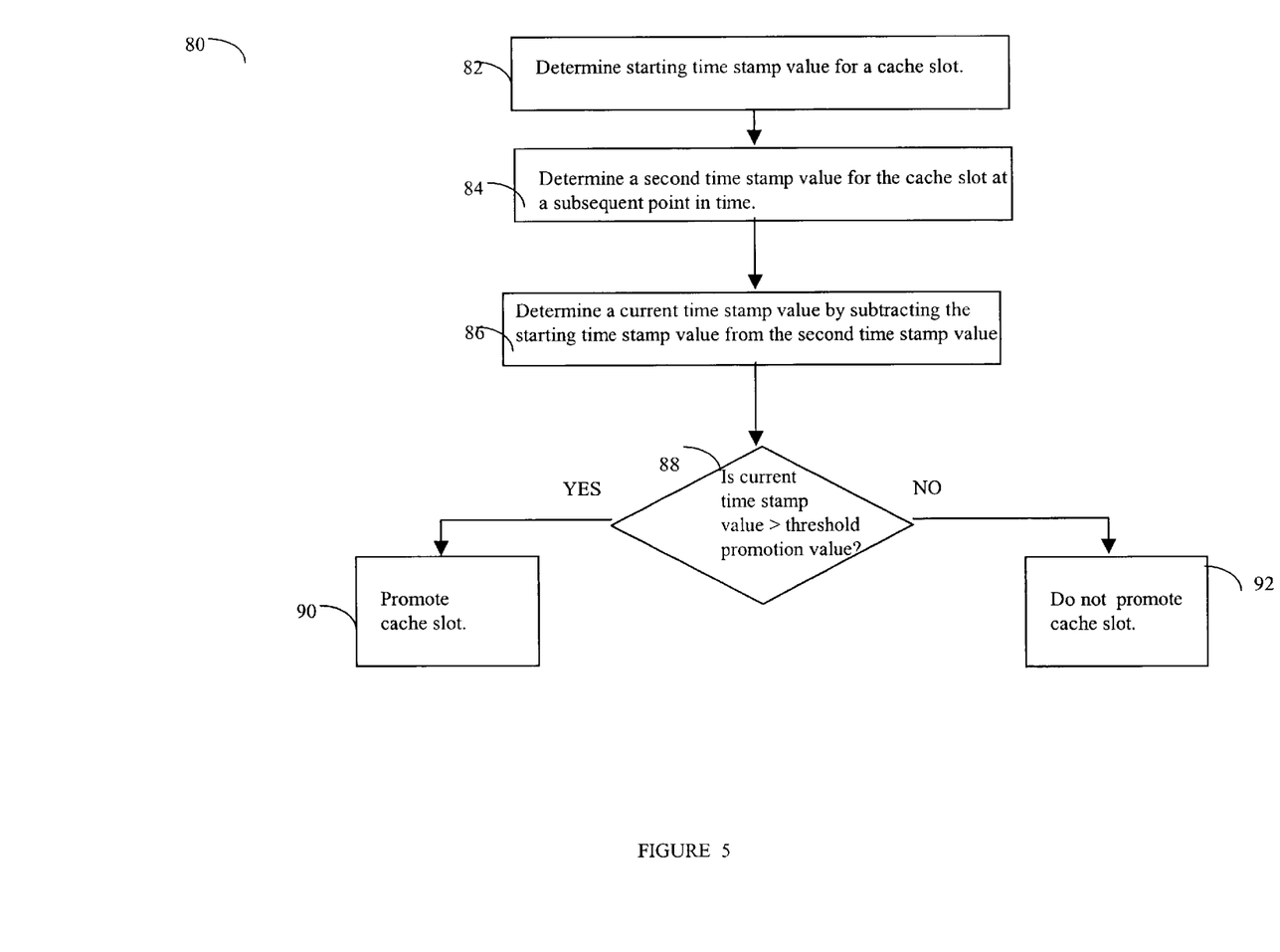
FIG. 5 is a flowchart of steps of one embodiment for determining when to promote a cache slot.

Referring now to FIG. 5, shown is a flowchart of steps of one embodiment as described in connection with FIG. 4 for a determination as to when a cache slot may be promoted. At step 82, a starting time stamp value is associated with a cache slot, such as, for example when a particular slot enters the cache at the head position. At step 84, a second time stamp value associated with a cache slot may be determined at a subsequent point in time as this particular cache slot moves through the replacement queue upon the occurrence of a hit or partial hit to the slot. At step 86, a current time stamp value is determined by subtracting the starting time stamp from the second time stamp value. At step 88, this current time stamp value is compared to the threshold promotion value. If the current time stamp value is greater than the threshold promotion value, then control may proceed to step 90 where the cache slot may be promoted.

However, if a determination is made that the time stamp value is not greater than the threshold promotion value, a determination may be made to proceed to step 92 where the cache slot is not promoted.

Generally, the threshold promotion value represents an amount of time that may correspond to a particular portion of the cache or replacement queue that may be used in determining when to promote particular cache slot. For example, if the average FTT associated with a replacement queue is four minutes, a threshold promotion value of three minutes may be determined. If the threshold promotion value is three minutes, this may correspond roughly to a cache slot within the last fourth of the replacement queue as the average amount of time it takes for a cache slot to exit and pass through the replacement queue is four minutes. Thus, a cache slot may be a candidate for promotion within the replacement queue if it is roughly within the last fourth of the replacement queue. The time is an approximate estimate as to the location of any particular slot within the replacement queue. The portion of the replacement queue from which candidates for promotion may be obtained may be represented as:

$$T > FTT - FTT/R \qquad \text{Equation 1}$$

or approximately equivalent to the last 1/R portion of the replacement queue in which: "FTT" is as described elsewhere herein as the average fall through time for an associated replacement queue, "1/R" represents a portion of the replacement queue from which promotion candidates may be obtained, and "T" represents an amount of time associated with a particular slot. For example, referring to the previous example with an FTT of 4 minutes and a threshold promotion value of 3 minutes, R is 4 such that cache slots for promotion may be selected from the last ¼ of the replacement queue based on the average FTT for the replacement queue and the desired threshold promotion value of 3 minutes.

It should be noted that the particular threshold promotion value may vary in accordance with each embodiment. In one embodiment, the threshold promotion value may be a configurable system parameter, for example, such as one that may obtain an initial value using a system configuration file, Subsequently, this parameter may be changed by a system manager or other user specification.

In this embodiment, as part of the promotion of a slot, a lock operation may be used in connection with the replacement queue as the replacement queue may be a shared resource acessed by multiple processors. This lock operation may be expensive in that it doesn't allow access by another user to perform another operation within the system 10 of FIG. 1. All elements within the replacement queue may be locked for exclusive use, for example, in connection with promoting a cache slot.

As part of efficiency and improving system performance, an embodiment may examine the instances at which a promotion may occur since such promotion operations using a lock may be expensive in terms of system resources and performance. Heuristics may be used to determine whether it is worth promoting a particular cache slot due to the associated costs with a promotion operation such as with the lock of the replacement queue.

What will now be described are techniques that may be used in connection with determining whether or not to promote a slot. The heuristic that will be described and used in connection with determining whether a cache slot is promoted includes examining three particular values. The first parameter is the chance or probability to lose a cache hit. The second parameter is the gain of a hit, and the third parameter is the price to promote the slot. Generally, if the chance or probability of losing a hit (first parameter) multiplied by the gain of a hit (second parameter) is greater than the price to promote a slot (third parameter), then a slot is promoted.

The foregoing may be represented as follows:

If (Chance to lose a hit*Gain of a hit)>(price to promote a slot) \qquad Equation 2 then promote a cache slot
else do not promote cache slot

It should be noted that the above Equation 2 is mathematically equivalent to the following:

if (Chance to lose a hit)>(price to promote a slot/gain of a hit) \qquad Equation 3

The price to promote a slot (third parameter) is a parameter that attempts to quantify the cost of a promotion, for example, determined in connection with alternative resource usages such as the CPU being used for other operations. In one embodiment, the promotion cost may be a dynamic parameter that may obtain a value, for example, in connection with a system configuration file or other type of user or system specified parameter. In one embodiment, a first promotion cost is determined and used when the replacement queue is locked. A second different promotion cost is used in connection with a replacement queue that is in the "unlocked" state. Thus, an embodiment may use two distinct values for promotion cost in connection with the state of the replacement queue as "locked" or "unlocked". In one example, one read miss, or cache miss for a read operation, is determined to be equal to fifteen promotions when the replacement queue is locked. Alternatively, when the replacement queue is unlocked, one read miss is equated to twenty-five promotions.

As explained in the following paragraphs, a cache miss or replacement queue miss may occur in connection with a read operation. By monitoring the system in connection with various operations, the foregoing costs as compared to a read hit may be associated with disks, buses, specific Symmetrix configurations and workload. It should be noted that these cost values are average approximations and may change in accordance with system performance.

As described herein, the gain of a hit strongly depends on the workload, and disk and bus utilization. The gain of a hit is an estimate or average. Thus, tests may be performed to determine a value for the ratio (price to promote)/(gain of a hit).

What will now be described is how to determine the first parameter representing the chance or probability of losing a hit. Generally, the probability of losing a hit (P (losing a hit)) may be represented as the product of two probabilities and represented as follows:

$P$(losing a hit)=$P$(hit after promotion)*$P$(read happens after slot leaves replacement queue) \qquad Equation 4

The first probability, P(hit after promotion), represents the situation where if the promotion occurs, what is the probability that this particular cache slot will be hit again. This may be multiplied by the second probability, P(read happens after slot leaves replacement queue), which represents if the current cache slot is not promoted, what is the probability that this particular slot will be read again after the slot is actually out of the replacement queue.

What will now be described are probabilities associated with a particular portion of the replacement queue. The probability P1 represents the probability that, once a particular slot is promoted to the head of the list, a cache hit will occur while that slot is within the replacement queue subsequent to promotion of the slot. Thus, P1 represents the probability that there will be read hit to the particular slot once promoted. The second probability P2 represents the probability that a read will occur to that particular slot after the slot is out of the replacement queue if that slot is not promoted.

The product of P1 times P2 collectively represents the chance or probability of losing a hit to a particular cache slot or P(losing a hit) as referenced above.

What will now be described are techniques that may be used in connection with determining probability P1 and probability P2.

Probability P1 or the chance of a hit after promotion of a cache slot may be determined by recording and monitoring information in connection with a special subgroup of read operations. This may be represented by a ratio as follows:

$$P1 = \frac{\#\_of\_slots\_hit\_after\_promotion}{\#\_of\_promoted\_slots} \quad \text{Equation 5}$$

in which P1 equals the number of slots that hit after promotion over the number of promoted slots. For a particular replacement queue, the number of slot promotions may be recorded. Subsequently, when there is a hit to that particular slot location subsequent to promotion, a notation may be made in connection with that particular cache slot. In an embodiment, the numerator and denominator portions may be updated when a slot exits the queue or when a slot is promoted, and a notation has been made that this particular slot has been promoted in the past and subsequently hit. This is how one particular embodiment may determine and record the information necessary in connection with determining the probability P1. In one embodiment, variables recording the values, such as the numerator and denominator portions associated with P1, may be updated at predetermined time intervals, for example, every minute. Other embodiments may use other techniques for determining this probability as well as vary the update time of the variables associated with recording P1 values.

The chance or probability of a hit after a slot has been promoted may also be represented as follows:

$$(C+D)/(A+B) \quad \text{Equation 6}$$

where:

"A" represents the number of cache slots that leave the replacement queue and have been promoted in the past;

"B" represents the number of slots that have been promoted in the past and are again promoted;

"C" represents the number of slots in A that had a hit after being promoted; and "D" represents the number of slots in B that had a hit after being promoted.

In the foregoing representation, the denominator is the sum of A and B representing the total number of slots that have been promoted in two general classes: (1) slots that are promoted at least once and then leave the replacement queue without another promotion at the tail portion by displacement (e.g.,A), and (2) slots that have been promoted at least once and are now promoted again moving to the head of the replacement queue (e.g., B). The numerator portion is the sum of C and D representing that portion of (A+B) having a hit after being promoted.

In one embodiment, one or more of A, B, C, and D may not include partial hits as monitoring is being performed of a system. A partial hit may refer to a reference in connection with a read in which only part of the data is stored in the replacement queue. To obtain all the data needed for the read operation, additional data is read from a device as it is not currently in the replacement queue. Alternatively, an embodiment may also include a portion or all of the partial read hits.

In connection with determining the probability P2, the probability of a hit after a slot leaves the replacement queue, data may be gathered in connection with the time between read hits for a particular slot and represented as a histogram F(x). Probability P2 may be expressed using F(x) and FTT as explained in more detail in following paragraphs.

F(x), where "x" is time, may represent a histogram recording the number of slots having a first read that may or may not be a hit to a slot, and then a second read that is a hit to the same slot at a time "x" later. The histogram bucket "x" collects the number of slots that have a consecutive reads to the same slot within the time [x−δ, x] in which at least the second read is a hit. In other words, to be included in the same bucket, the second hit may occur within a time span or interval. A different embodiment may use different time intervals. For example, an embodiment may use a different "δ" or time interval range between 2 seconds and 0.5 seconds.

Figure 6:
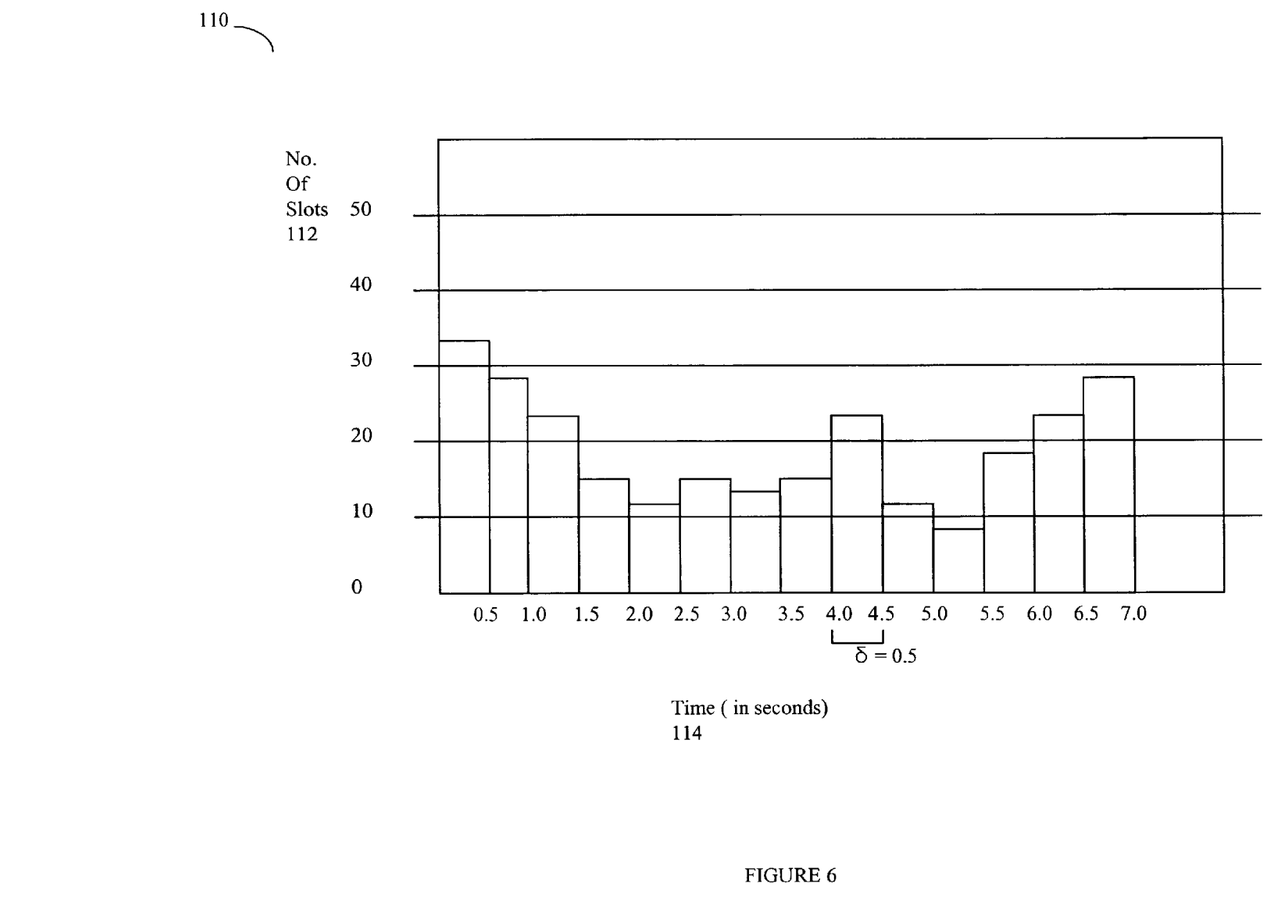
FIG. 6 is a graphical representation of a function F(x) representing a distribution of a number of replacement queue slots that experience a subsequent read hit for a predetermined time interval.

Referring now to FIG. 6, shown is a graphical representation 110 of F(x) with a δ=0.5. Included in the graphical representation on the x axis 114 are time intervals represented in seconds. On the y axis 112 are an associated number of slots representing the number of slots having a consecutive read that is a hit within a certain time distance from the previous read to the same slot.

In one embodiment, the function F(x) represents a distribution of the number of slots recorded that experience a subsequent read hit for a predetermined time interval. Using the foregoing, and an assumption of a uniform probability distribution of the location of the slots that have been hit in the last 1/R portion of the replacement queue, the probability that a read will happen after the cache slots leave the replacement queue, P2, may be represented as:

$$P2 = \frac{R \sum_{x=\delta}^{x=FTT/R} x*F(x)}{FTT} + \sum_{x=(FTT/R)+\delta}^{x=FTT} F(x)}{\sum_{x=\delta}^{x=FTT} F(x)} \quad \text{Equation 7}$$

where "FTT" is the average fall through time associated with the replacement queue, "x" represents a time in seconds, "1/R" represents the portion of the replacement queue as described elsewhere herein in connection with the threshold promotion value. It should be noted that 1/R represents that portion of the replacement queue from which slots may be promoted, and 1−(1/R) represents an approximate portion of the replacement queue slots that are not promoted.

An embodiment may monitor a system and collect data in which variables or other storage locations are updated at predetermined time intervals that may vary in accordance with each embodiment. For example, one embodiment may collect and update A, B, C, D, and F(x) at one minute intervals. For each interval, the numbers taken into account are the ones collected during each particular interval. At the end of each interval, a current promotion policy is determined that holds for the next subsequent time interval.

Data may also be collected by monitoring a system, such as the system 10 of FIG. 1, to determine the FTT and data associated with the histogram F(x).

The foregoing techniques used in determining whether to promote a cache slot may be applied at a "global" or a "local" level in connection with a data storage system, such as that of FIG. 2. In one embodiment, application of the foregoing techniques "locally" may include using a local set of data in each host adapter (HA). Data may also be collected locally in connection with each HA to produce the histogram. Alternatively, an embodiment may apply the foregoing techniques "globally", for example, by using a single histogram stored in global memory. To produce the global histogram, the system may be monitored and data obtained collectively for all HAs.

Each of the local and global applications has its advantages and disadvantages. For example, local application generally tends to reflect local behavior of each HA. Global application may produce an average of all system behavior. Local application may be less costly to obtain data as information is stored locally and not globally. However, since each HA has its own partial set of data, the data may be insufficient to properly perform statistical calculations. The particular application of local or global may vary in accordance with the requirements of each embodiment.

As described herein, the foregoing statistics may be determined by monitoring particular operations of the system. However, an embodiment may also vary the types of operations monitored in connection with determining statistics. For example, the foregoing description includes monitoring read operations of a system and ignoring partial read hits. However, an embodiment may also include monitoring a system and counting a portion or all of the partial read hits in the foregoing statistics.

In addition to the criteria described herein that may be represented as:

(the chance to lose a hit)>((price to promote a slot)/(the gain of a hit))

other criteria may be used to determine whether to promote a slot. In one embodiment, the size of the last hit, such as the number of blocks read from a particular slot for the current hit, may be used as criteria in determining a promotion policy. A first set of values for A, B, C, D and F(x) may be used when all blocks of a slot have been read, and a second different set of values for A, B, C, D and F(x) may be used when the entire slot has not been read. Additionally, an embodiment may also use one or more weighting factors in proportion to the portion of a slot that is read when determining values for P1 and P2.

One or more of the values used in connection with the foregoing may be dynamic. An embodiment may include functionality for "tuning" one or more of the foregoing values. An embodiment may include functionality such that the value of "R" as used in connection with a threshold promotion value may be "tuned". An embodiment may use P2 and F(x) to determine an optimal value for "R" in accordance with each system. For example, if the FTT of a replacement queue is 6 minutes, and the threshold promotion value is 3, R may initially be 2. A slot in the second half of the replacement queue may be promoted. However, after monitoring the system, it may be determined that the probability that an additional read will occur after the slot leaves the cache does not change much when R is increased. Such observations may cause a determination to be made that a smaller portion of the replacement queue should be considered in connection with promotions thus raising the threshold promotion value. An embodiment may update R to be 3 rather than 2 resulting in an updated threshold promotion value of 4 minutes.

Additionally, an embodiment may also use another histogram in determining an optimal value for "R". For example, in one embodiment, the histogram may use values for "x" representing the amount of time that has lapsed between when the particular slot has last been at the head of the replacement queue and when a slot is hit. It should be noted that this is similar to the value described elsewhere herein as the "current time stamp value" in connection with FIG.

The foregoing techniques described herein for determining whether to promote a replacement queue slot may be used when the replacement queue is locked and/or when the replacement queue is unlocked. In other words, an embodiment may define a promotion policy such that the foregoing techniques are employed when the replacement queue is locked, when the replacement queue is unlocked, or in both instances regardless of the state of the replacement queue. Such a promotion policy may also be dynamic, for example, in that a user such as a system manager may modify the promotion policy.

In connection with use of the foregoing techniques in accordance with the state of the replacement queue as being one of locked or unlocked, an embodiment may use different cost values as described elsewhere herein.

It should be noted that an embodiment for unlocked should promote a minimum number or percentage of slots regardless of the heuristic used and the promotion determination result. This minimum level of promotions may vary in accordance with each embodiment and, as described elsewhere herein, may also be dynamic such that it may be "tuned" in accordance with the performance characteristics of each particular system. This minimum level may set forth a condition that overrides the promotion determination made in accordance with heuristics described herein.

As described herein, techniques have been presented for determining a promotion policy of when to promote a slot at a particular point in time. What will now be described in connection with FIG. 7 is how this policy may be utilized in an embodiment.

Figure 7:
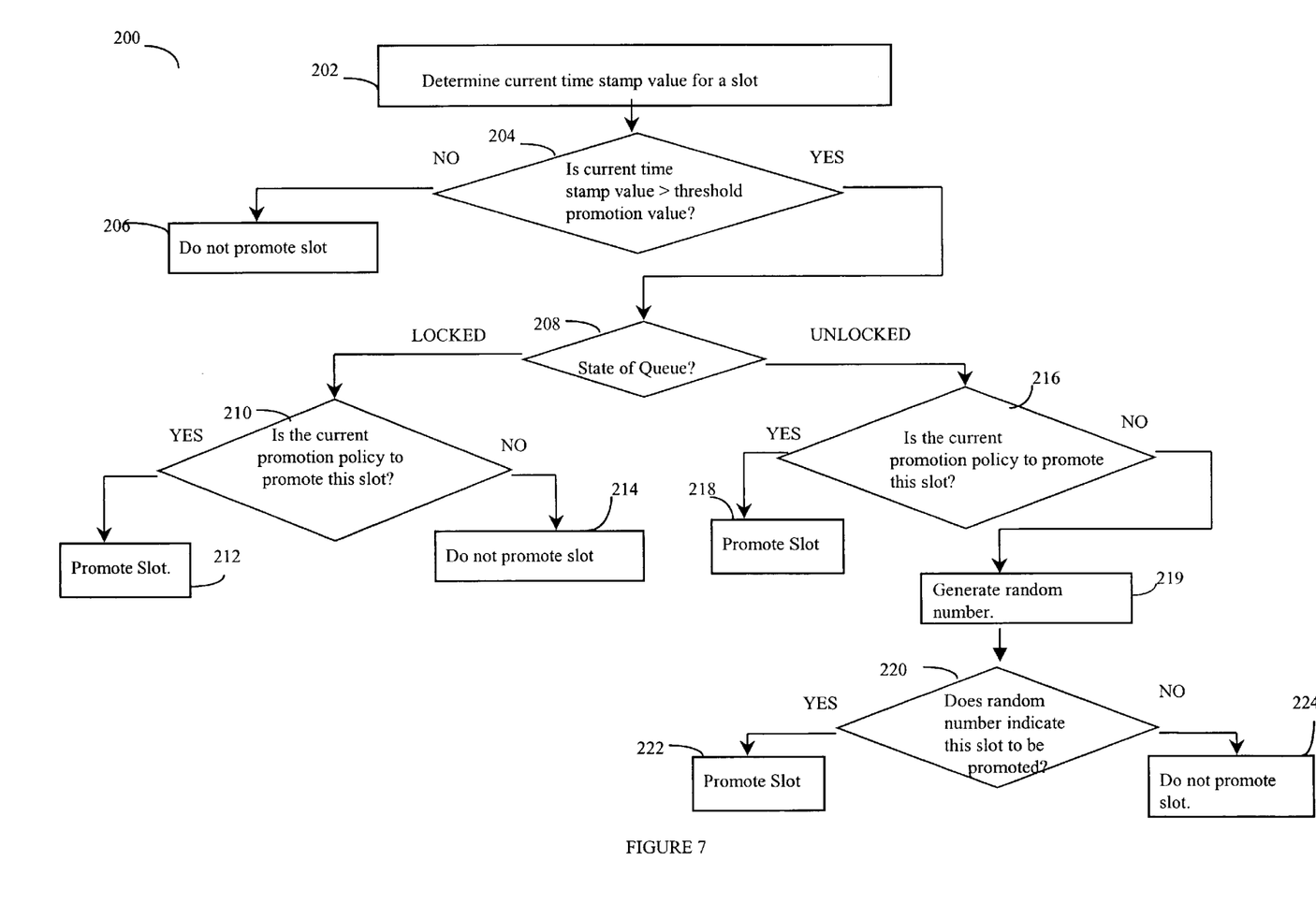
FIG. 7 is a flowchart of steps of one embodiment for utilizing a promotion policy decision in the system of FIG. 1.

Referring now to FIG. 7, shown is a flowchart of steps of one embodiment for determining whether to promote a slot within the replacement queue. At step 202, the current time stamp value for a particular slot is determined. It should be noted that a current time stamp value for a particular slot may be determined by subtracting a starting time stamp value associated with the time when that particular slot was last at the head of the replacement queue and subtracting that value from a second time stamp value associated with that same slot at a particular point in time at a later entry in the replacement queue. This was described, for example, in connection with flowchart 80 of FIG. 5 at steps 82, 84 and 86. At step 86, a current time stamp value may be determined similar to that as in connection with step 202.

Control proceeds to step 204 where a determination is made as to whether the current time stamp value determined at step 202 is greater than a pre-determined threshold promotion value. If a determination is made that the current time stamp value is not greater than the threshold promotion value, control proceeds to step 206 where a determination is made not to promote the slot under consideration. Otherwise, at step 204, if a determination is made that the current time stamp value is greater than the threshold promotion value, control proceeds to step 208. At step 208, a determination is made as to whether the state of the replacement queue is locked or unlocked. If a determination is made at step 208 that the state of the replacement queue is locked, control proceeds to step 210 where a further determination is made as to whether the current "locked" promotion policy is to promote the current slot.

If a determination is made at step 210 that the current promotion policy is to promote the current slot, then control proceeds to step 212 where a decision is made to promote the slot currently under consideration. Otherwise, control proceeds to step 214 where a determination is made not to promote the slot.

At step 208, if the state of the replacement queue is otherwise determined as unlocked, control proceeds to step 216 where a further determination is made as to whether the current unlocked promotion policy is to promote the current slot. If the current promotion policy is to promote the current slot, control proceeds to step 218 where the slot is promoted. Otherwise, control proceeds to step 219 where a random number may be generated that indicates whether to promote the slot even though the current promotion policy decision is not to promote the current slot. This results in promotion of a predetermined number of slots regardless of the current promotion policy at a particular time to ensure that a minimal number of promotions occur so there will be sufficient information for subsequent interval calculations. For example, an embodiment may decide that 20% of the time, a slot should be promoted even though the current policy indicates, at step 216, the current slot should not be promoted. An embodiment may use other techniques besides those described herein with random number generation in connection with overriding the current promotion policy examined at step 216.

Control proceeds to step 220 where a determination is made as to whether the random number generated indicates that the slot should be promoted overriding the current promotion policy. If so, control proceeds to step 222 where the slot is promoted even though the current promotion policy decision is not to promote the current slot. Otherwise, control proceeds to step 224 where the current slot is not promoted.

It should be noted that an embodiment may define a promotion policy in which the foregoing may be used when the replacement queue is in the locked and unlocked state, for example, as set forth in flowchart 200 of FIG. 7. An embodiment may also include a promotion policy which uses certain criteria, such as whether:

(the chance to lose a hit)>((price to promote a slot)/(the gain of a hit))

in determining whether to promote a slot when the replacement queue is in the locked state. Otherwise, this criteria may not be used when the replacement queue is in the unlocked state. Other criteria may be used in this instance in determining whether to promote a slot. The particular policy and criteria included in an embodiment may vary in accordance with each embodiment. When the replacement queue is in the unlocked state, and a slot is promoted, the replacement queue subsequently is locked to perform necessary updates.

It should be noted that described herein are techniques used in performing calculations and gathering data for each time interval and accordingly determining a promotion policy of whether to promote a slot or not. The method of flowchart 200 of FIG. 7 may use this policy, for example, upon the occurrence of hit to determine whether to promote a slot.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining whether to promote a cache slot within a cache comprising:

determining whether a probability of losing a cache hit is greater than a ratio of a cost associated with promoting said cache slot to the gain of a cache hit; and promoting said cache slot in response to determining that said probability is greater than said ratio, said promoting placing said cache slot at a different position within said cache to increase duration of said cache slot being included in said cache.

2. The method of claim 1, wherein said cache is in one of a state of locked and unlocked, and said steps of determining and promoting are used when said cache is in one of said locked and unlocked states.

3. The method of claim 2, wherein a first value equating a read miss to a number of promotions is used when said cache is in a locked state, and a different second value equating a read miss to a second different number of promotions is used when said cache in an unlocked state.

4. The method of claim 1, wherein said probability of losing a cache hit is a mathematical product of a first probability, a probability of a cache hit occurring after said cache slot is promoted multiplied by a second probability, a probability that a read to a portion of storage corresponding to said cache slot occurs after said cache slot is displaced from the cache is said cache slot if not promoted.

5. The method of claim 4, further comprising:

determining said first probability by monitoring a portion of read operations within said computer system, and wherein said determining said first probability further includes:

determining a number of slots hit after promotion for a predetermined time period;

determining a number of promoted slots for a predetermined time period; and determining said first probability as a ratio of said number of slots hit after promotion to said number of promoted slots.

6. The method of claim 4, further comprising:

determining said first probability by monitoring a portion of read operations within said computer system, and wherein said determining said first probability further includes, for a predetermined time period:

determining a first number of slots, A, that are displaced from said cache and have been promoted at least once;

determining a second number of slots, B, that are promoted at a second point in time and at a first point in time prior to said second point;

determining a portion of the slots in A, C, having a hit after being promoted;

determining a portion of the slots in B, D, having a hit after being promoted; and determining said first probability at (C+D)/(A+B).

7. The method of claim 4, further comprising:

determining said second probability by collecting data determining an amount of time between a first read and a second read for cache slots included in said cache, wherein at least said second read is a hit, said data being represented as a histogram F(x), of the number of slots having a subsequent hit within said amount of time, x.

8. The method of claim 7, wherein said second probability is represented as:

$$P2 = \frac{R\sum_{x=\delta}^{x=FTT/R} x*F(x)}{FTT} + \sum_{x=(FTT/R)+\delta}^{x=FTT} F(x)}{\sum_{x=\delta}^{x=FTT} F(x)}$$

where 1/R represents a portion of said cache, and FTT represents an average amount of time a cache slot it takes for said cache slot to be fall through said cache.

9. The method of claim 8, wherein said second probability and F(x) are used to determine a value for R.

10. The method of claim 8, wherein 1/R represents a threshold portion of said cache in which a slot is not considered for promotion unless said slot is within said threshold portion of said cache.

11. The method of claim 7, wherein said cache has a head position associated with a first position of said cache denoting a least likely slot to be removed, and the method further comprising:
determining a second histogram G(x) in which x represents an amount of time that has lapsed between when a slot is hit and when the particular slot has been at the head position of the cache.

12. The method of claim 11, wherein 1/R represents a portion of said cache having slots being considered for promotion, and said method further comprising:
using said second histogram G(x) in determining a value for R.

13. The method of claim 1, further comprising:
specifying an override promotion value; and
promoting said cache slot if said cache is unlocked and a number of promotions made is less than said override promotion value, said promoting of said cache slot being performed independent of said determining.

14. The method of claim 1, further comprising:
using criteria in said determining wherein at least one parameter of said criteria is a dynamic parameter that may be modified.

15. The method of claim 14, further comprising:
determining an initial value of said at least one parameter using a configuration file.

16. The method of claim 1, wherein said cache is in a locked state and said determining and said promoting are only used when said cache is in a locked state.

17. A computer program product for determining whether to promote a cache slot within a cache comprising machine executable code for:
determining whether a probability of losing a cache hit is greater than a ratio of a cost associated with promoting said cache slot to the gain of a cache hit; and
promoting said cache slot in response to determining that said probability is greater than said ratio, said promoting placing said cache slot at a different position within said cache to increase duration of said cache slot being included in said cache.

18. The computer program product of claim 17, wherein said cache is in one of a state of locked and unlocked, and said machine executable code for determining and promoting is used when said cache is in one of said locked and unlocked states.

19. The computer program product of claim 18, wherein a first value equating a read miss to a number of promotions is used when said cache is in a locked state, and a different second value equating a read miss to a second different number of promotions is used when said cache in an unlocked state.

20. The computer program product of claim 17, wherein said probability of losing a cache hit is determined using machine executable code for determining a mathematical product of a first probability, a probability of a cache hit occurring after said cache slot is promoted multiplied by a second probability, a probability that a read to a portion of storage corresponding to said cache slot occurs after said cache slot is displaced from the cache is said cache slot if not promoted.

21. The computer program product of claim 20, further comprising machine executable code for:
determining said first probability by monitoring a portion of read operations within said computer system, and wherein said machine executable code for determining said first probability further includes:
machine executable code for determining a number of slots hit after promotion for a predetermined time period;
machine executable code for determining a number of promoted slots for a predetermined time period; and
machine executable code for determining said first probability as a ratio of said number of slots hit after promotion to said number of promoted slots.

22. The computer program product of claim 20, further comprising:
machine executable code for determining said first probability by monitoring a portion of read operations within said computer system, and wherein said machine executable code for determining said first probability further includes, for a predetermined time period:
machine executable code for determining a first number of slots, A, that are displaced from said cache and have been promoted at least once;
machine executable code for determining a second number of slots, B, that are promoted at a second point in time and at a first point in time prior to said second point;
machine executable code for determining a portion of the slots in A, C, having a hit after being promoted;
machine executable code for determining a portion of the slots in B, D, having a hit after being promoted; and
machine executable code for determining said first probability at (C+D)/(A+B).

23. The computer program product of claim 20, further comprising:
machine executable code for determining said second probability by collecting data determining an amount of time between a first read and a second read for cache slots included in said cache, wherein at least the second read is a hit, said data being represented as a histogram F(x), of the number of slots having a subsequent hit within said amount of time, x.

24. The computer program product of claim 23, wherein said second probability is represented as:

$$P2 = \frac{R \sum_{x=\delta}^{x=FTT/R} x*F(x)}{FTT} + \sum_{x=(FTT/R)+\delta}^{x=FTT} F(x)}{\sum_{x=\delta}^{x=FTT} F(x)}$$

where 1/R represents a portion of said cache, and FTT represents an average amount of time a cache slot it takes for said cache slot to be fall through said cache.

25. The computer program product of claim 24, further comprising:
  machine executable code that uses F(x) and said second probability in determining a value for R.

26. The computer program product of claim 24, wherein 1/R represents a threshold portion of said cache in which a slot is not considered for promotion unless said slot is within said threshold portion of said cache.

27. The computer program of claim 23, wherein said cache has a head position associated with a firts position of said cache denoting a least likely slot to be removed, and the computer program product further comprising:
  machine executable code that determines a second histogram G(x) in which x represents an amount of time that has lapsed between when a slot is hit and when the particular slot has been at the head position of the cache.

28. The computer program product of claim 27, wherein 1/R represents a portion of said cache having slots being considered for portion, and the computer program product further comprising:
  machine executable code that used said second histogram G(x) in dertermine a value for R.

29. The computer program product of claim 17, further comprising machine executable code for:
  specifying an override promotion value; and
  promoting said cache slot if said cache is unlocked and a number of promotions made is less than said override promotion value, said promoting of said cache slot being performed independent of said determining.

30. The computer program product of claim 17, further comprising:
  machine executable code for using criteria in said determining wherein at least one parameter of said criteria is a dynamic parameter that may be modified.

31. The computer program product of claim 30, further comprising:
  machine executable code for determining an initial value of said at least one parameter using a configuration file.

32. The computer program product of claim 17, wherein said cache is in a locked state and said machine executable code for determining and promoting are only used when said cache is in a locked state.

33. A method for determining whether to promote a cache slot within a cache comprising:
  determining whether a probability of losing a cache hit is greater than a ratio of a cost associated with promoting said cache slot to the gain of a cache hit; and
  promoting said cache slot in response to determining that said probability is greater than said ratio, said promoting placing said cache slot at a different position within said cache to increase duration of said cache slot being included in said cache,
  wherein said probability of losing a cache hit is a mathematical product of a first probability multiplied by a second probability, said first probability being a probability of a cache hit occurring after said cache slot is promoted, said second probability being a probability that a read to a portion of storage corresponding to said cache slot occurs after said cache slot is displaced from the cache is said cache slot if not promoted.

34. The method of claim 33, further comprising:
  determining said first probability by monitoring a portion of read operations within said computer system, and wherein said determining said first probability further includes, for a predetermined time period:
    determining a first number of slots, A, that are displaced from said cache and have been promoted at least once;
    determining a second number of slots, B, that are promoted at a second point in time and at a first point in time prior to said second point;
    determining a portion of the slots in A, C, having a hit after being promoted;
    determining a portion of the slots in B, D, having a hit after being promoted; and
    determining said first probability at (C+D)/(A+B).

35. The method of claim 34, further comprising:
  using a first set of values for A, B, C, and D when all portions of a slot are read and a second different set of values when an entire slot has not been read.

36. The method of claim 33, further comprising:
  using a weighting factor in proportion to an amount of a slot that is read when determining said first probability and said second probability.

37. The method of claim 33, further comprising:
  using a first set of values for F(x) when an entire slot is read and a second different set of values for F(x) otherwise, wherein F(x) is a histogram of the number of slots having a first read and a second subsequent read that is a hit within an amount of time, x.

38. A method for determining whether to promote a cache slot within a cache comprising:
  determining whether a probability of losing a cache hit is greater than a ratio of a cost associated with promoting said cache slot to the gain of a cache hit, said probability of losing a cache hit being determined using at least one value determined in accordance with a size of a hit of a slot; and
  promoting said cache slot in response to determining that said probability is greater than said ratio, said promoting placing said cache slot at a different position within said cache to increase duration of said cache slot being included in said cache.

39. The method of claim 38, further comprising:
  using a first value in determining the probability of losing a cache hit when a slot is entirely read, and a second different value otherwise.

40. The method of claim 38, further comprising:
  using a weighting factor in determining the probability of losing a cache hit wherein said weighting factor is determined in accordance with a portion of a slot that is read.

41. A computer program product for determining whether to promote a cache slot within a cache comprising:
  machine executable code that determines whether a probability of losing a cache hit is greater than a ratio of a cost associated with promoting said cache slot to the gain of a cache hit; and machine executable code that promotes said cache slot in response to determining that said probability is greater than said ratio, said promoting placing said cache slot at a different position within said cache to increase duration of said cache slot being included in said cache, wherein said probability of losing a cache hit is a mathematical product of a first probability multiplied by a second probability, said first probability being a probability of a cache hit occurring after said cache slot is promoted, said second probability being a probability that a read to a portion of storage corresponding to said cache slot occurs after said cache slot is displaced from the cache is said cache slot if not promoted.

42. The computer program product of claim 41, further comprising:

machine executable code that determines said first probability by monitoring a portion of read operations within said computer system, and wherein said machine executable code that determines said first probability further includes, for a predetermined time period, machine executable code that:

determines a first number of slots, A, that are displaced from said cache and have been promoted at least once;

determines a second number of slots, B, that are promoted at a second point in time and at a first point in time prior to said second point;

determines a portion of the slots in A, C, having a hit after being promoted;

determines a portion of the slots in B, D, having a hit after being promoted; and determines said first probability at (C+D)/(A+B).

43. The computer program product of claim 42, further comprising:

machine executable code that uses a first set of values for A, B, C, and D when all portions of a slot are read and a second different set of values when an entire slot has not been read.

44. The computer program product of claim 41, further comprising:

machine executable code that uses a weighting factor in proportion to an amount of a slot that is read when determining said first probability and said second probability.

45. The computer program product of claim 41, further comprising:

machine executable code that uses a first set of values for F(x) when an entire slot is read and a second different set of values for F(x) otherwise, wherein F(x) is a histogram of the number of slots having a first read and a second subsequent read that is a hit within an amount of time, x.

46. A computer program product that determines whether to promote a cache slot within a cache comprising:

machine executable code that determines whether a probability of losing a cache hit is greater than a ratio of a cost associated with promoting said cache slot to the gain of a cache hit, said probability of losing a cache hit being determined using at least one value determined in accordance with a size of a hit of a slot; and machine executable code that promotes said cache slot in response to determining that said probability is greater than said ratio, said promoting placing said cache slot at a different position within said cache to increase duration of said cache slot being included in said cache.

47. The computer program product of claim 46, further comprising:

machine executable code that uses a first value in determining the probability of losing a cache hit when a slot is entirely read, and a second different value otherwise.

48. The computer program product of claim 46, further comprising:

machine executable code that uses a weighting factor in determining the probability of losing a cache hit wherein said weighting factor is determined in accordance with a portion of a slot that is read.

* * * * *

UNITED STATES PATENT AND TRADEMARK OFFICE
CERTIFICATE OF CORRECTION

PATENT NO.    : 6,715,039 B1
DATED         : March 30, 2004
INVENTOR(S)   : Michael et al.

It is certified that error appears in the above-identified patent and that said Letters Patent is hereby corrected as shown below:

<u>Title Page,</u>
Item [75], "Orit Levin Michael" should read -- Orit Levin-Michael --.

Signed and Sealed this

Twenty-ninth Day of June, 2004

JON W. DUDAS
*Acting Director of the United States Patent and Trademark Office*